Aug. 28, 1962 F. J. FULLER 3,051,945
GATE CORRELATED DATA LINK SYSTEM
Filed Dec. 27, 1956
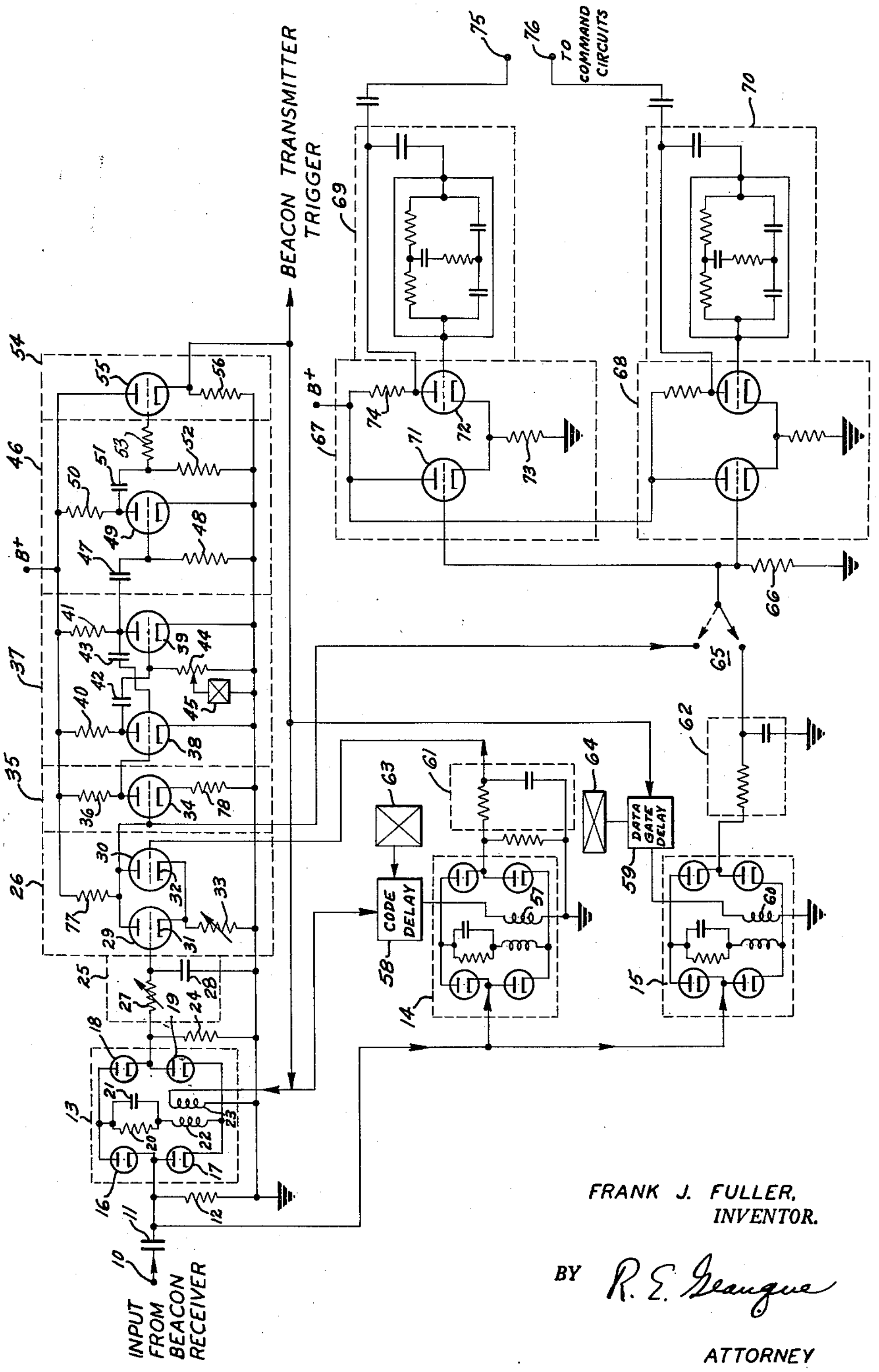
FRANK J. FULLER,
INVENTOR.
BY R. E. Geauque
ATTORNEY United States Patent Office 3,051,945
Patented Aug. 28, 1962

3,051,945

GATE CORRELATED DATA LINK SYSTEM

Frank J. Fuller, 11133 Encino Ave., Granada Hills, Calif.

Filed Dec. 27, 1956, Ser. No. 630,780
8 Claims. (Cl. 343—6.8)

The present invention relates to tracking and/or guidance beacon systems of the command and data types, and more particularly relates to an improved beacon system incorporating an independent gate pulse generator whose output is correlated with pulse input signals for phase, frequency and code coincidence.

A similar system is disclosed in applicant's co-pending application Serial No. 597,391, filed July 12, 1956, and entitled "Cryptographic Phase and Frequency Cross-Correlator System," now abandoned. The present invention offers greater immunity to various types of interference, as well as other advantages.

One object of the present invention is the provision of a beacon system with an input signal having at least two pulses forming a synchronization code for correlating an independent gate pulse generator with the signal.

It is another object of this invention to provide a beacon system with improved range, reliability and overall system performance by substantial reduction of the effects of internal receiver noise.

Another object is the substantial reduction of the effects of undesired signals on the security of the tracking, data and/or command functions of a beacon system by providing such a system with a cross-correlation process in combination with coding and cryptographic programming of such parameters as code spacing, pulse repetition rate, and pulse repetition phase.

An additional object is the provision of a beacon tracking system with an independent pulse generator for triggering the beacon transmitter at zero level signal reception.

It is a further object to provide a beacon tracking system with improved synchronized transmitter-triggering whereby trigger skip and transmitter jitter may be substantially eliminated in spite of greatly reduced incoming signal levels.

Another object is to provide a data and/or command beacon system with an independent gate pulse generator and a coded delay for correlating gate pulses with data or command pulses of the input signal, thereby eliminating data signals not satisfying both code and repetition rate parameters.

A further object is the provision of a data and/or command beacon system with data modulation at extremely low frequencies in order to reduce noise and interference.

An additional object is the provision of a beacon system with clock timing mechanisms and/or counting mechanisms in conjunction with pulse recurrence frequency generators on both ends of the beacon link whereby pulse phase, frequency and code parameters may be cryptographically programmed at both ends of the link.

According to the present invention, the beacon system utilizes an independent gate pulse generator for supplying a single gating pulse in each pulse repetition period. This pulse is used for triggering the beacon transmitter and also, with proper treatment thereof, for cross-correlating its own phase and pulse repetition rate. In one embodiment, the gating pulse is also used for gating a data or command pulse. In a preferred embodiment of the present invention, the input signal from the beacon receiver consists of three pulses, the first two of which form a synchronization code by means of the time delay therebetween and the third of which constitutes a data or command pulse separated from the second synchronization pulse by a predetermined time delay. Coordinated cryptographic variations, incorporated throughout the beacon system, may be used to vary the gate pulse repetition rate as well as the time delays between the three pulses of the input signal. A code coincidence gate correlates the gate pulse generator frequency with that of the input signal, and the gate pulse with the first pulse of the input signal, only when code requirements are satisfied. Data or command functions may be detected by low frequency filter discriminators from either extremely low frequency amplitude modulation of the third pulse or else time modulation of the repetition period of the first two synchronization pulses.

The features of the present invention which are believed to be novel are set forth with particularity in the appended claims. The present invention, both as to its organization and manner of operation, together with further objects and advantages thereof, may be best understood by reference to the following description, taken in connection with the accompanying drawing, in which the sole figure is a schematic diagram of a circuit in accordance with the present invention.

Referring to the sole figure, the aforesaid pulse input signal from the beacon receiver (not shown) is fed into the circuit at input 10, through coupling capacitor 11 and over load resistor 12 to three bipolar diode bridges 13, 14 and 15. Said bridges are identical to each other. Refrerring to bridge 13, it includes four diodes 16, 17, 18 and 19 in bipolar arrangement. Resistor 20 is shunted by capacitor 21, which are in series with inductor 22 across the bridge. Gate pulse inductor 23 is in mutual inductance coupling relationship to inductor 22. Any output of bridge 13 is coupled across load resistor 24, through an integrator 25 to a code coincidence stage 26. Integrator 25 includes variable resistor 27 and capacitor 28. Code coincidence stage 26 includes two tubes 29 and 30 with common cathodes 31 and 32, a common cathode load resistor 33, and a common plate load resistor 77. The integrated output of bridge 13 is fed to the grid of tube 29, and the integrated output of bridge 14 is fed to the grid of tube 30. Any signal developed across plate resistor 77 is coupled to the grid of tube 34 of amplifier stage 35, which stage also includes plate load resistor 36 and cathode bias resistor 78. The amplifier output is fed to an independent gate pulse generator 37 which may comprise the illustrated multivibrator having two tubes 38 and 39, plate resistors 40 and 41, plate-to-grid capacitors 42 and 43, and grid resistor 44. Cryptographic programmer 45 may be used to change the natural frequency of the gate pulse generator 37 at a predetermined intervals by changing the effective value of grid resistor 44. The gate pulses are fed to a pulse shaper 46, including input coupling capacitor 47, grid resistor 48 and tube 49, and output network of resistor 50, capacitor 51 and resistor 52. The gate pulse is coupled through resistor 53 to a cathode follower 54, which includes tube 55 and cathode load resistor 56. The gate pulse may then be coupled to the beacon transmitter trigger, as indicated, as well as to the gating bridges 13, 14 and 15. The gate pulse is coupled directly to bridge 13 through gate pulse inductor 23 for phase and frequency comparison and correlating with the input signal 10. Reference is made to my co-pending application No. 597,391, referred to herein above, for a more complete examination of such phase and frequency comparison. The gate pulse is also coupled to inductor 57 of bridge 14, but through a code delay network 58, indicated in block form. Similarly, the gate pulse is coupled through data gate delay network 59 to inductor 60 of bridge 15. The delay networks 58 and 59 may be virtually any type well known in the art. The output signals from bridges 14 and 15 are integrated by networks 61 and 62, respectively, being similar to integrator network 25. Cryptographic programers 63 and 64 may be coupled to delay networks 58 and 59, respectively, for cryptographically varying the gate pulse time delays in accordance with predetermined factors. The programers 45, 63 and 64 may be of any type well known in the art, such as clock mechanisms or pulse counters. The complete system programers would be present and coordinated in accordance with well-established procedures. The integrated output signal from bridge 14 is coupled to the grid of tube 30 in the code coincidence stage 26. The integrated output signal from bridge 15 may be supplied, through switch 65 when it is in the amplitude modulation position, over load resistor 66 to filter circuits 69 and 70. Filter circuits 67 and 68 may be identical and circuit 67, for example, includes twin triodes 71 and 72, common cathode resistor 73, and plate load resistor 74. Similar circuits, well known in the art, may be substituted. Similarly twin-T or other low frequency selective circuits may be substituted for the Wien circuits illustrated. The data or command signals are supplied at output terminals 75 and 76 to command circuits (not shown).

The operation of the above circuit may be described as follows. The independent gate generator 37 will supply pulse signals at its natural frequency or repetition rate in the absence of any input signal from the beacon receiver. Upon the occurrence of a properly coded input signal from the receiver, an automatic search for phase and frequency coincidence will take place, eventually producing coincidence error outputs simultaneouly from bridges 13 and 14, such output being utilized to change the phase and frequency of the gate generator 37 to correspond to that of the input signal. Integration by integrator circuits 25 and 61 of the coincidence error before introducing it as a control of the gate generator 37 substantially reduces the effects of internal or external noise on the coincidence tracking system. Once coincidence has been established, tracking continues in operation as follows: the input signal having two initial pulses separated by a coded time delay, and the gate pulses being supplied to bridge 13 without delay and to bridge 14 through code delay 58 (which corresponds in time to the delay between the first and second input signal pulses), both bridges 13 and 14 will be supplying direct current control voltages through their output integration circuits. These output voltages are coupled to the grids of tubes 29 and 30, respectively, of the code coincidence stage 26. Due to the characteristics of said tubes and to mutual cathode feedback, the voltage across the plate load resistor 77 will not vary appreciably in response to either grid of said tubes unless both grids are modulated by the integrated outputs of bridges 13 and 14. It is understood, of course, that other prior art devices may be used for code coincidence stage 26. Thus, control voltage will be applied to amplifier tube 34, and thence to the independent gate generator, only when the pulse repetition rate, phase, and code requirements are satisfied. The gate generator 37 then will be running in phase and pulse repetition rate coincidence with the first pulse of the coded input signal and supplying gate pulses, suitably shaped by shaper circuit 46 and cathode follower 54, to the gate transformers in bridges 13, 14 and 15, the pulses to the latter two bridges being delayed by the appropriate coded time delays 58 and 59 before application to their respective gate transformers.

The time programers 45, 63 and 64 are indicated for cryptographic modulation of system parameters. Thus, programer 45 changes the natural frequency of the independent gate generator 37 at predetermined intervals by changing the value of the grid resistance 44. Timers 63 and/or 64 change the values of the coded time spacing between the gate applied to bridge 13 and those applied to bridges 14 and 15. In the associated transmitter for the ground or airborne radar associated with this beacon system, corresponding timers are synchronized with the beacon timers as part of operational procedures. Alternatively, pulse counters may be employed rather than timers. In this case the counters would be coupled into the astable pulse generator 37.

It should be emphasized that the beacon transmitter is triggered by the independent pulse generator 37 rather than by the input signal from the beacon receiver. Therefore, there is no lower limit of signal level required for triggering the beacon transmitter. During loss of signal, the transmitter continues to transmit, thereby facilitating ground radar contact, search and acquisition. In addition, the substantial reduction of trigger jitter by this method reduces the time jitter imposed on the radar tracking circuits, thereby extending the range performance of the radar, as well as extending the range performance of the beacon.

Referring now to bridge 15 which is utilized to gate the third pulse of the input signal, this bridge passes the data information ultimately to the command circuit terminals 75 and 76. The circuit constants of selective circuits 69 and 70 are so chosen that each such circuit will pass a different frequency of amplitude modulation, say $W_1$ and $W_2$, respectively. Thus, if the third pulse is amplitude modulated at a frequency $W_1$, then the channel leading to terminal 75 will pass that modulation. If the third pulse is amplitude modulated at a frequency $W_2$, then the channel leading to terminal 76 will pass that modulation. When these modulation frequencies $W_1$ and $W_2$ are quite low (i.e., below one cycle per second), then the reduction of noise and interference is enhanced by a factor approximately equal to the pulse repetition rate divided by the frequency of the data modulation. Inasmuch as selective circuits 69 and 70 provide high selectivity, it becomes possible to crowd many control channels below one cycle per second with inter-channel security. Due to the effective low bandpass, the data system also becomes, like the tracking system, relatively immune to internal and external noise, thereby lending itself to reliable operation at reduced signal levels and, thus, extending the range of reliable communication.

In a similar manner, the data system may be executed by applying the control voltage from the code coincidence gate 26 to the low frequency filters through the switch 65. In such case, the pulse repetition period is time modulated by a fractional amount of the pulse rise time. The control voltage at the plate load resistor 77 will track this modulation, which modulation will be detected by the low frequency discriminators as described previously in conjunction with data modulation of a third pulse.

While particular embodiments of the present invention have been shown and described, it will be obvious to those skilled in the art that changes and modifications may be made without departing from this invention in its broader aspects, and, therefore, the aim in the appended claims is to cover all such changes and modifications as fall within the true spirit and scope of this invention.

What is claimed is:

1. A gated pulse radar data link system including, in combination: means for providing an input signal including at least two initial pulse signals and an intelligence carrying pulse signal having predetermined time delay intervals therebetween; an independent gate pulse generator for providing gate pulses having a repetition rate nominally the same as said input signal; at least first, second and third gating bridges effectively coupled to said gate pulse generator, said second and third gating bridges having gate signal input delay means for delaying said gate pulses in corresponding relation to said predetermined time delay intervals of said input signal; said bridges each having a separate input circuit coupled to said signal providing means; each of said bridges having an output circuit code coincidence means coupled to said output circuits of said first and second bridges and effectively coupled to said independent gate generator for correlating the phase and repetition rate of said input signal with said gate pulses only during the occurrence of output signals from both said first and second bridges; means coupled to said output circuit for said third bridge and responsive to said intelligence of said intelligence carrying pulse signal.

2. A gated pulse radar beacon system including, in combination: a receiver for providing an input signal including at least two initial pulse signals and an intelligence carrying pulse signal having predetermined time delay intervals therebetween; an independent gate pulse generator for providing gate pulses having a repetition rate nominally the same as said input signal; at least first, second and third gating bridges, each of said bridges having a first and a second input circuit; said input signal being coupled to each of said first input circuits of said gating bridges; gate pulse delay means coupled to said second input circuits of said second and third gating bridges; said gate pulses being coupled to said second input circuit of said first bridge, said gate delay means of said second bridge and said gate pulse delay means of said third bridge; each of said gate pulse delay means providing predetermined time delays of said gate pulses corresponding to said predetermined time delay intervals of said input signal pulses whereby each of said bridges will gate a different one of said pulses of said input signal; first, second and third output circuits for said first, second and third bridges, respectively; a code coincidence stage having first and second input circuits and an output circuit, said output circuit for said first bridge being coupled to said first input circuit of said code coincidence stage and said output circuit for said second bridge being coupled to said second input circuit of said code coincidence stage; said code coincidence stage being responsive to a signal in either of its said input circuits to provide an output signal to its ouput circuit only during the occurrence of signals in each of its said input circuits; said output circuit of said code coincidence stage being effectively coupled to said independent gate generator for controlling the phase and pulse repetition rate thereof in correlation with said input signal from said receiver; means coupled to said output circuit for said third bridge and responsive to said intelligence of said intelligence carrying pulse signal.

3. A system in accordance with claim 2 wherein said first, second and third output circuits for said first, second and third bridges include integration means.

4. A system in accordance with claim 2 further including cryptographic means coupled to said independent gate pulse generator for varying the pulse repetition rate thereof in accordance with predetermined variations of the pulse repetition rate of said input signal.

5. A system in accordance with claim 2 wherein said gate pulse delay means include cryptographic means for varying the gate pulse time delays in accordance with predetermined variations of the time intervals between the pulses of said input signal.

6. A data modulation and demodulation system including, in combination: means for providing an input signal including two pulses having predetermined time delay intervals therebetween; an independent gate pulse generator for providing gate pulses having a repetition rate nominally the same as said input signal; first and second gating bridges effectively coupled to said gate pulse generator, said second gating bridge having gate signal input delay means for delaying said gate pulses in corresponding relation to said predetermined time delay intervals of said input signal; said bridges each having a separate input circuit coupled to said input signal providing means; each of said bridges having an output circuit; code coincidence means coupled to said output circuits of said first and second bridges and effectively coupled to said independent gate generator for correlating the phase and repetition rate of said input signal with said gate pulses only during the occurrence of output signals from both said first and second bridges; said input signal having its repetition period modulated by a fraction of the pulse width at low frequencies, said modulation being detected by said code coincidence means; and low frequency filter means coupled to said code coincidence means for presenting said detected modulation to command and data utilization means.

7. A pulse radar beacon system including: an independent pulse generator for repetitively generating a pulse signal and having input and output means; radar beacon transmitter means coupled to said output means and responsive to said pulse signal for being triggered thereby; receiver means coupled to said input means for receiving external pulse signals including synchronization coded pulses and a data pulse following said coded pulses by a coded delay; gate means coupled to said receiver means; gate pulse delaying means coupled between said output means and said gate means for delaying said generated pulse signal to form synchronization code gate and data gate pulses; said receiver means having astable code gating decoder means correlating the repetition rate and phase of said synchronization gate pulses with said external pulse signals when said external pulse signals have the same synchronization code as that of said code gate pulses; and means coupled to said gate means for detection of said data pulse upon coincidence thereof with said data gate pulse.

8. A pulse decoding system including, in combination: an astable pulse code generator for repetitively providing pulse code signals; receiver means for receiving coded pulses; and coincidence means coupled to both said receiver means and said astable pulse code generator, said coincidence means being solely responsive to such received coded pulses which are phase and code coincident with said repetitively provided pulse code signals.

References Cited in the file of this patent

UNITED STATES PATENTS

| | | |
|---|---|---|
| 2,538,027 | Mozley | Jan. 16, 1951 |
| 2,544,204 | Whitfield | Mar. 6, 1951 |
| 2,582,971 | Dunmore | Jan. 22, 1952 |
| 2,606,282 | Lipkin | Aug. 5, 1952 |
| 2,609,533 | Jacobsen | Sept. 2, 1952 |
| 6,671,897 | Woodbury | Mar. 9, 1954 |
| 2,706,244 | Kuder | Apr. 12, 1955 |
| 2,711,532 | Slusser | June 21, 1955 |
| 2,783,371 | Frank | Feb. 26, 1957 |